United States Patent [19]

Richards

[11] 3,924,484
[45] Dec. 9, 1975

[54] SENSOR UNBLOCKING RAMPS
[75] Inventor: Elmer A. Richards, Oshtemo, Mich.
[73] Assignee: Eaton Corporation, Cleveland, Ohio
[22] Filed: Mar. 20, 1974
[21] Appl. No.: 452,726

[52] U.S. Cl. .................... 74/331; 74/339; 74/372; 192/53 E; 192/53 F; 192/48.91
[51] Int. Cl.². F16H 3/08; F16D 13/20; F16D 21/00
[58] Field of Search .................... 74/331, 372, 339; 192/48.91, 53 F, 53 E

[56] References Cited
UNITED STATES PATENTS

| | | | |
|---|---|---|---|
| 2,380,559 | 7/1945 | Tyken | 192/53 F |
| 2,635,477 | 4/1953 | Dunn | 192/53 F X |
| 2,916,939 | 12/1959 | Neracher et al. | 192/53 F |
| 2,919,774 | 1/1960 | Russell | 192/53 F |
| 3,347,347 | 10/1967 | Hetmann | 192/53 F |
| 3,799,002 | 3/1974 | Richards | 192/48.91 X |

*Primary Examiner*—Samuel Scott
*Assistant Examiner*—P. S. Lall
*Attorney, Agent, or Firm*—Teagno & Toddy

[57] ABSTRACT

Shiftable gearing including spring loaded means and blocker means for effecting engagement of clutch teeth. In a transmission having a main shaft and at least one countershaft, and including pairs of shiftable gears arranged on and cooperatively between said shafts, there are provided spring loaded clutches for effecting connection to one of said shafts of a selected one gear of a selected one of said pairs of said gears upon the achievement of substantial synchronization between such gear and such shaft. Blockers are provided for protecting the clutch teeth from excessive wear during such shifting and malfunctioning of said blockers is prevented in part by providing light frictional drag means between each of said blockers and the portion of said clutches rotatable with said shaft and in part by angling the leading surfaces of the blocker teeth an amount sufficient to effect an unblocking under one limited set of conditions but insufficient to prevent blocking under normal operating conditions. Said drag acts axially to cause said blockers to bear against the gear cone and thereby to rotate therewith promptly upon the commencement of an engaging or clutching operation. Said angling enables said blockers to effect their own unblocking under certain special conditions of operation where the blockers otherwise tended to lock into blocking position but does not prevent proper operation thereof under normal operating conditions.

10 Claims, 9 Drawing Figures

SENSOR UNBLOCKING RAMPS

FIELD OF THE INVENTION

This invention relates to a shiftable change speed gear device and particularly relates to a transmission, preferably a multiple countershaft transmission, having resiliently yieldable shifting mechanisms for substantially simplifying shifting of the transmission and further having blocker means of simplified construction for improving the operation thereof.

BACKGROUND OF THE INVENTION

In the design of transmissions, particularly heavy duty transmissions such as used on trucks, there has existed for a long time the problem of shifting the transmission through the various speed ratios, which problem is even greater when the transmission is provided with an auxiliary or range transmission section for increasing the number of speed ratios. In most known transmissions, the shifting process is either relatively difficult and/or the shifting mechanism is relatively complex. Thus, there has been a continuing effort in the design of transmissions to improve the shifting, to improve the rapidity of shifting, to reduce the complexity of the shifting mechanism and to reduce its cost. Hence, without detracting from the operability or desirability of many of the shifting mechanisms previously known, it may be stated that in the present invention these general objectives are accomplished to even a greater degree than has been previously possible.

Particularly, most known transmissions have necessarily utilized synchronizers, of which many different types are known, for causing the speed of the jaw or toothed clutch members to be substantially synchronized prior to permitting their interengagement during a shifting sequence from one speed ratio to another speed ratio. While the use of synchronizers does permit the shifting operation to be performed, their use, as is already known, imposes certain requirements of weight, space and power which it is desirable to ease, or avoid entirely, if possible.

These and other problems incident to previously known transmissions were set forth and acknowledged in my application Ser. No. 276,376, now U.S. Pat. No. 3,799,002 entitled "Transmission with Resiliently Loaded Main Shaft Gears" assigned to the same assignee as the present application and apparatus was disclosed therein which effectively meets these problems while providing a reliable, effective and efficient transmission, particularly for heavy duty use.

While both forms of the invention disclosed in said application, namely that using blockers and that not using blockers, are effective for carrying out the objectives thereof, it has been noted that for the usual reasons both noise and clutch tooth wear can be minimized by the use of blockers as set forth in said application and since the date thereof a considerable amount of further investigation has been carried out related thereto, both for the simplifying of the blocker structure and for improving the operation thereof.

In this last connection, it was noted in the further development of the embodiment shown in said application using blockers that sometimes after a period of neutral condition with the vehicle stopped it was impossible to shift the auxiliary transmission in an upshift direction. This could usually be cured by first shifting momentarily from neutral into reverse, but this obviously was an inconvenient and a highly undesirable technique and it appreciably hampered the commercial acceptability of an otherwise highly satisfactory transmission.

In further development and study of this transmission, particularly with respect to the problem just named, it was discovered that said problem occurred when the front box of the transmission came into neutral with the vehicle stopped and an upshift selected. Because of the previous mode of operation in a lower gear, the blocker can be unblocked for such upshift only be reducing the speed of the main shaft which here, since it is in the case in question already stopped, can be accomplished only, as above noted, by momentarily reversing the main shaft.

In addition it was noted that during a compound shift the change in speed of the main shaft caused by the other member involved in the sequence can cause inertia forces exceeding the random contact forces on the blocker. This causes the blocker to change position during the interval while the shaft is changing speed. When the second member of the sequence starts to move into position under this condition, the blocker immediately unblocks resulting in an undesirable presynchronous shift.

Accordingly it is an object of the present invention to provide a transmission having improved shifting structure for overcoming the above-mentioned disadvantages. Particularly, it is an object of the present invention to provide:

1. A transmission having means to improve the ease of shifting, to improve the rapidity of shifting without requiring large synchronizers, to reduce complexity of the mechanism and to reduce its cost.

2. A transmission, as aforesaid, which utilizes resilient means for causing meshing engagement of the jaw clutch members after the desired speed synchronization has been achieved.

3. A transmission, as aforesaid, having the main shaft gears floatingly supported relative to the main shaft by a plurality of countershaft gears so as to minimize the inertia of the main shaft and including clutch collars keyed to the main shaft for cooperation of the main shaft gears.

4. A transmission, as aforesaid, utilizing blockers for assisting in effecting a smooth and noise-free shift and particularly for minimizing the wear on the inter-engaging jaw clutch teeth.

5. To provide a transmission, as aforesaid, wherein the previously existing above-described tendency to require momentary reverse operation before shifting out of an idling condition is eliminated.

6. To provide blockers of such structure in relationship to other components of the transmission as to eliminate the above-mentioned previously existing tendency for erroneous positioning of such blockers with respect to the clutch components.

7. To provide a transmission and blocker arrangement wherein the blockers on the main shaft part of a jaw clutch will be subjected to sufficient axial drag as to cause same to bear against the gear cone and thus effect a rotative force exceeding the inertia forces occurring thereon and thereby to effect a proper positioning thereof.

8. To provide a blocker construction of simplified but yet stronger construction than previously known blockers of this general type and nature.

Other objects and purposes of the invention will become apparent to persons acquainted with devices of this type upon reading the following specification and inspecting the accompanying drawings.

BRIEF DESCRIPTION OF THE DRAWINGS

In the drawings:

FIG. 8 is an enlarged fragmentary detail of the blocker ring teeth taken from the same direction as shown in FIG. 5.

Figure 1:
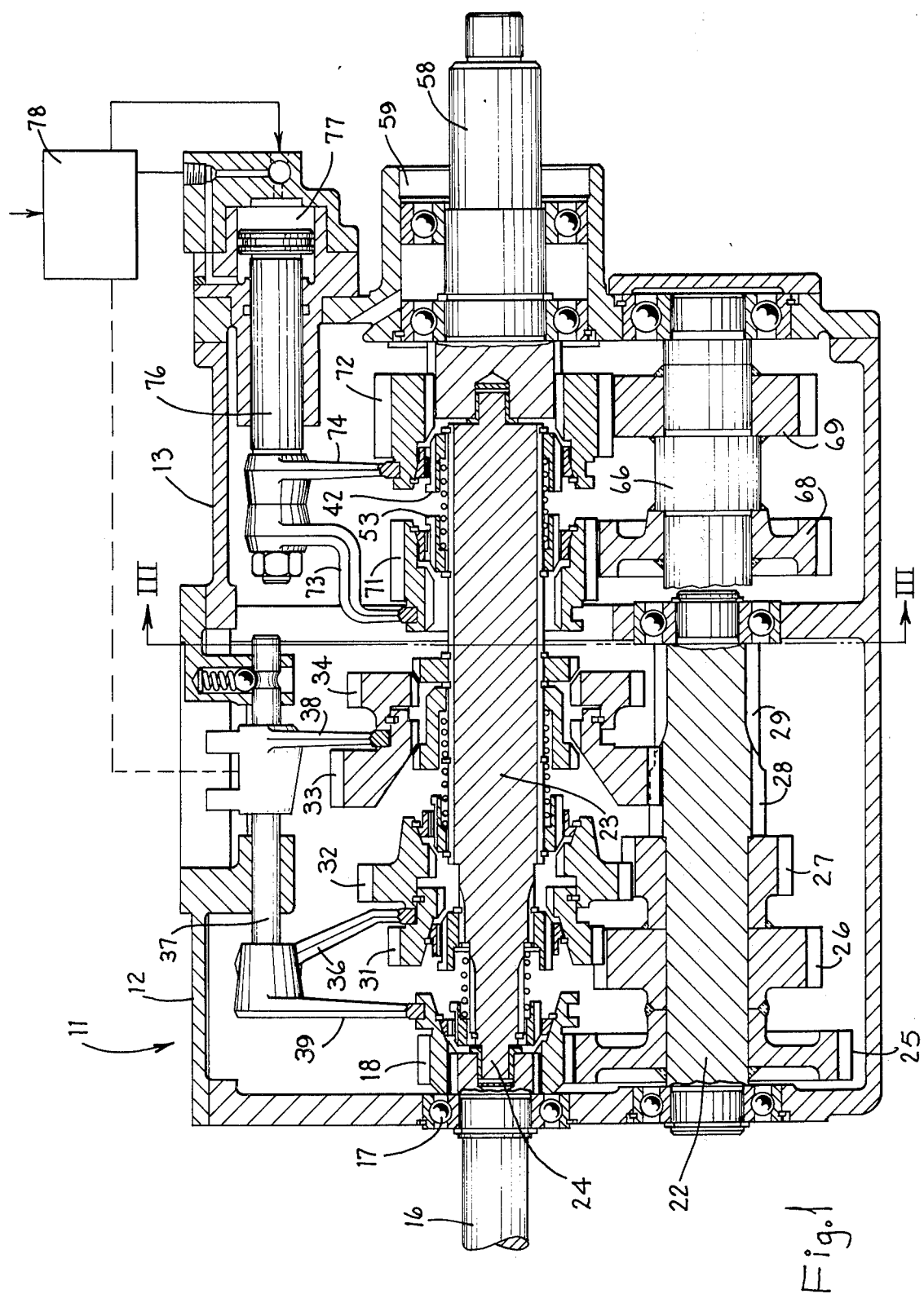
FIG. 1 is a cross-sectional view of a transmission utilizing blockers of the type disclosed and claimed in the above-mentioned application and out of which arose the need for this present invention, the main transmission portion thereof being taken along the line I—I of FIG. 3 and the auxiliary transmission portion thereof being taken along line I—IA of FIG. 3.

Referring now to the apparatus in more detail, it will be recognized that a detailed disclosure of both the structure and operation of the transmission in question has been set forth and claimed in the above-mentioned application and reference is therefore made thereto for such details. Same will, however, be briefly summarized herein at least, as to the form thereof with which the present invention is concerned, for purposes of convenient reference and clear understanding of the present invention.

SUMMARY OF THE INVENTION

Insofar as concerns the integration of the blocker into the entire transmission system, the blockers are placed between the two relatively slidable portions or components of most or all of the transmission clutches and the usual friction means are provided for causing the blocker to rotate with one thereof as said clutch components respectively move toward each other during a clutching procedure. As same occurs, the blocker limits such relative axial movement until substantial synchronism between the clutch elements involved in a given shift is achieved.

In the present invention, the blocker and the other clutch element of a given clutchable pair of clutch components are provided with slightly angling leading faces on the blocker teeth to effect an unblocking where the main shaft is otherwise unconnected to any other main shaft gears and hence at a minimum inertia. The angling of said blocker teeth is, however, insufficient to effect unblocking during a normal shift and hence will not interfere with the required function thereof during a normal shift. There is further provided means by which a significant axial drag with a minimum of rotational drag is provided constantly between the blocker ring and the clutch element blocked thereby. Thus, said blocker ring will be axially urged upon axial movement of said last-named clutch element into engagement with the driving cone of the other clutch element and will thereby be held in proper position against the effect of its own inertia with respect to the gear associated therewith. This assures that the blocker will be in the desired position prior to contact with the blocking surface of the clutch.

The blocker element itself also contains advantageous features in that there is removed only one portion of one tooth of a clutch element and the blocker ring is provided with a pair of teeth extending toward the clutch element from which a part of said one tooth has been removed. Said pair of teeth are of sufficient circumferential spacing to straddle the remaining portion of said one tooth when synchronization is achieved for effecting an unblocking condition but said blocker teeth are themselves of circumferential dimension less than the spacing between the teeth on said clutch element for permitting circumferential shifting thereof and the creation of a blocking condition. Additional groups each comprising a partially removed tooth on the clutch component and cooperating teeth on the blocker ring may be provided as desired.

DETAILED DESCRIPTION

Referring to the drawings, there is illustrated a transmission 11 having both a main transmission section 12 and a range or auxiliary transmission section 13, each of which has a plurality of selectable ratios. The main and range sections are both suitably enclosed by conventional housing means.

Figure 2:
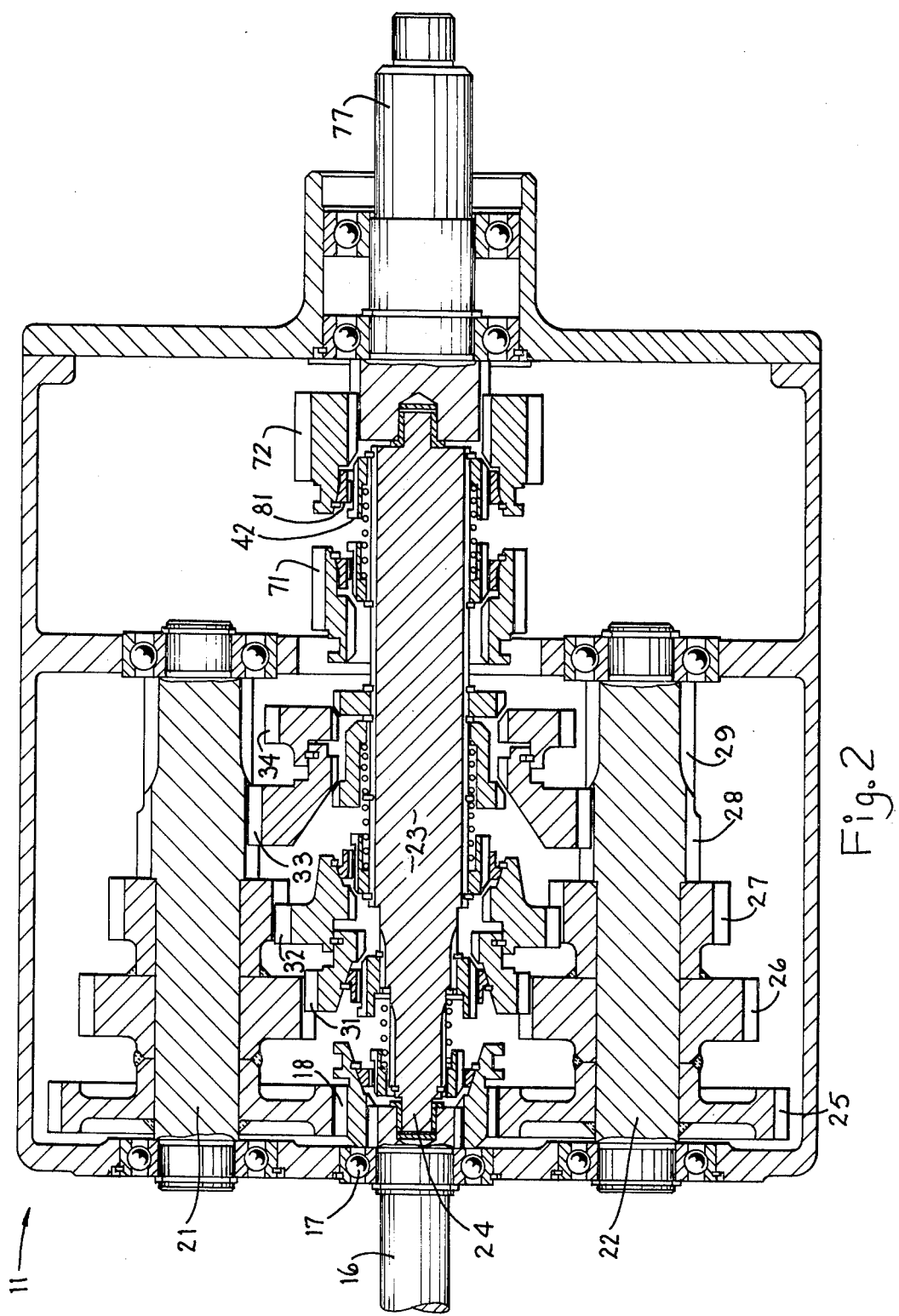
FIG. 2 is a cross-sectional view of said transmission taken substantially along the line II—II of FIG. 3.

The transmission 11 includes an input shaft 16 supported adjacent its rearward end by a bearing 17 and provided with an input gear 18 nonrotatably connected thereto, as by splines. The input gear 18 simultaneously drives a plurality of countershafts at equal speeds. In the illustrated embodiment, the transmission is provided with two countershafts 21 and 22 (FIG. 2) disposed on diametrically opposite sides of the main shaft 23, which main shaft is coaxially aligned with the input shaft 16 and is provided with a pilot portion 24 on its forward end rotatably received within and supported by the rearward end of the input shaft 16.

Each of the countershafts 21 and 22 is provided with an identical grouping of countershaft gears 25, 26, 27, 28 and 29 thereon, which groupings form pairs of gears, such as the pair of gears 26, of identical size and number of teeth and disposed on diametrically opposite sides of the main shaft 23.

A plurality of main shaft drive gears 31, 32, 33 and 34 encircle the main shaft and are selectively clutchable thereto one at a time by yieldable clutch mechanisms, as described in greater detail hereinafter.

The main shaft gears 31, 32 and 33 encircle the main shaft 23, are in continuous meshing engagement with, and are floatingly supported by, the diametrically opposed pairs of countershaft gears 26, 27 and 28, respectively, which mounting means and the special advantages resulting therefrom are explained in greater detail in U.S. Pat. Nos. 3,105,395 and 3,335,616. The main shaft gear 34 is the reverse gear and is in continuous meshing engagement with the pair of countershaft gears 29 by means of conventional intermediate gears (not shown). The forwardmost countershaft gears 25 are continually meshed with and driven by the input gear 18 for causing simultaneous rotation of the countershafts 21 and 22 whenever the input shaft 16 is rotatably driven.

As illustrated in FIG. 1, the input gear 18 is connected to a conventional shift fork 39, which shift fork is controlled by the shift rod 37 for permitting input gear 18 to be shifted axially for selectively permitting direct driving engagement between the input shaft 16 and the main shaft 23.

The main shaft gears 31 and 32 are axially interconnected to form a gear pair and are connected to a conventional shift fork 36, the position of the shift fork 36 being controlled in a conventional manner by means of an appropriate shift rod similar to rod 37. The main shaft gear pair 31–32 is thus shiftable axially relative to the main shaft 23 in response to axial shifting of the fork 36 by said rod. However, the gears 31 and 32 are independently rotatable relative to one another. In a similar manner, the main shaft gears 33 and 34 are also axially interconnected so as to be axially shiftable as a pair by means of the shift fork 38, which shift fork is also controlled by appropriate shift means. The main shaft gear pair 33–34 is likewise and simiarly axially movable relative to the main shaft 23.

Figure 3:
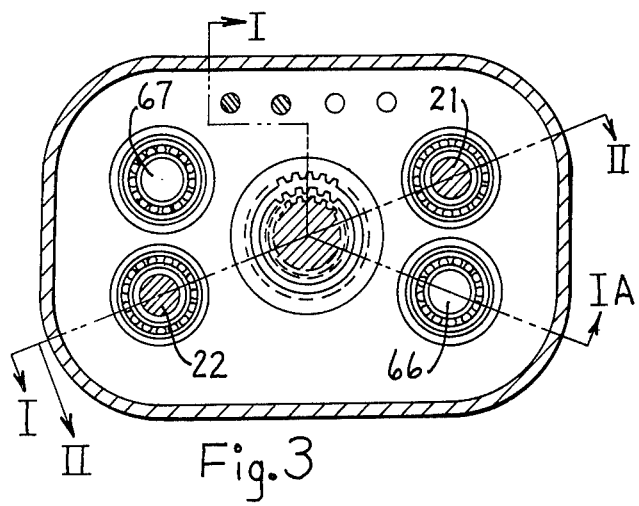
FIG. 3 is a sectional elevational view taken along the line III—III of FIG. 1.

Considering now the range section 13, said main shaft 23 extends thereinto and is coaxially arranged with and piloted into an output shaft 58 which is in turn supported within the housing 13 by suitable bearings generally indicated at 59. Said range section further includes a plurality of countershafts 66 and 67 (FIG. 3) each having an identical grouping of countershaft gears thereon, of which two appear at 68 and 69 (FIG. 1). The first pair of countershaft gears 68 are disposed diametrically opposite and in continuous meshing engagement with a main shaft gear 71, which main shaft gear is floatingly supported by the forward pair of countershaft gears, one being the gear 68 for substantially concentrically encircling the main shaft 23. A further main shaft gear 72 is also floatingly and substantially concentrically supported relative to the main shaft 23 by the rearward pair of countershaft gears, one being the gear 69. Shift forks 73 and 74, respectively, are provided for effecting the shifting of gears 71 and 72 and said shift forks are operated by appropriate shift rods of which one appears at 76 for operation by any desired means such as the pressure cylinder 77. Appropriate control means 78 of presently known type is provided for properly effecting and interrelating the control of the shift means for the forward gears 18 and 31–34 and the range gears 71 and 72.

The yieldable clutch structures are arranged between the shiftable main shaft gears in both the main transmission and the range section and are provided with resilient means for urging engagement thereof as set forth in detail in said above-mentioned application. While said clutch means are not identical with each other, they are generally similar and hence insofar as the present invention is concerned, it will be sufficient to describe only one of them in detail with the understanding that same may be applied to the other clutch units without difficulty by anyone skilled in the art. Therefore, for this purpose, referring to the rearwardmost clutch unit, namely that positioned between the range gear 72 and the main shaft 23, as illustrated in detail in FIG. 4, same is generally designated 41 and includes an annular clutch collar 42 encircling the main shaft 23. The clutch collar 42 is provided with internal splines 43 which are disposed within corresponding external splines 44 provided on the main shaft 23 for interconnecting the clutch collar 42 to the main shaft 23 for rotation therewith. However, the cooperating splines 43 and 44 permit the clutch collar 42 to freely slide axially relative to the shaft 23. A stop ring 46 is seated within a suitable groove formed on the external periphery of the shaft 23 and is disposed for contacting the clutch collar 42 and limiting the axial movement thereof. The collar 42 is normally resiliently urged by means of a spring 47 into abutting engagement with the stop ring 46.

The clutch collar 42 is provided with external teeth 48 thereon which are adapted to meshingly engage the internal teeth 50 provided on one of the main shaft gears, such as the gear 72. The teeth 48 on the clutch collar 42 are tapered, as at 51, and in a similar manner the leading edge of the teeth 50 on the main shaft gear 72 are similarly tapered as at 52. The confronting tapered conical surfaces 51 and 52 each extend at an angle of preferably between 30 and 40 degrees relative to the longitudinal axis of the main shaft 23. The exact degree of taper, and the advantages thereof, are explained in detail in U.S. Pat. No. 3,265,173. The other end of the spring 47 resiliently acts against a further clutch collar 53 (FIG. 1) which collar is identical to the collar 42 but is disposed so that it has the tapered leading ends of its teeth facing in the opposite direction.

Further resilient, substantially identical, clutch assemblies are provided for the other shiftable gear sets but same are set forth in detail in the above-mentioned application and hence further description thereof is unnecessary here.

The invention as thus far referred to is set forth in more detail in the above-mentioned application particularly in connection with FIGS. 1–5 thereof and reference is invited thereto for further details. In such application, it was stated that there are some instances wherein blockers are desirable, particularly for conditions of heavy load and consequent very rapid changes in relative gear speeds, and it is to this portion of said previous intention to which the present invention relates.

With this in mind, attention is now directed to the blockers shown in the drawings herewith as incorporated into the clutch units as desired for operation therewith.

Referring again to FIG. 4, a selected number, here three, of the teeth 48 are partially removed for permitting the presence of the blocking ring as hereinafter further described. Such partial removal leaves, however, a shortened tooth 49 for cooperation with the blocking ring.

Referring now to the blockers, one thereof is indicated generally at 81 and comprises a ring encircling the clutch component 42 and has an appropriate number, here three pairs, of radially inward projections 82 and 83 which when properly positioned will mate with the external teeth above mentioned. The inward projections or teeth 82 and 83 are contoured at their sides to lie snugly against adjacent ones of the teeth 48, are positioned to project into the spaces between a partially removed tooth 49 and the teeth 48 on each side thereof. Each pair of teeth 82 and 83 are circumferentially of less dimension than the corresponding circumferential spaces defined by partially removed teeth 49. The space, however, between the inwardly projecting teeth 82 and 83 is only a clearance distance wider than the corresponding circumferential dimension of the tooth 49 so that when properly aligned at synchronism (or more accurately, when the relative speeds of the clutch components cross synchronism) the teeth 82 and 83 will straddle the tooth 49 and the clutch component 42 can move axially through but not past blocker ring 81 to effect engagement with its corresponding gear.

Figure 9:
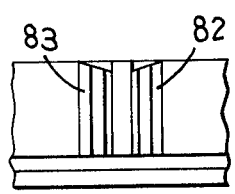
FIG. 9 is a view taken in the direction of the arrows IX—IX in FIG. 8.

The end faces of said blocker teeth 82 and 83 are tapered (FIG. 9) with the direction of taper being such that the cutback portion of each tooth is on the side thereof facing the other of said two teeth. The amount of such taper appears to be at optimum of about 12°–15° with respect to a plane perpendicular to the longitudinal direction of the tooth with an apparent feasible range of approximately 10° to 17°. The amount of such tooth face which is tapered should be sufficient to, but need not be more than enough to, fully overlap the adjacent corner of the remaining portion 49 of the partially removed tooth.

Figure 4:
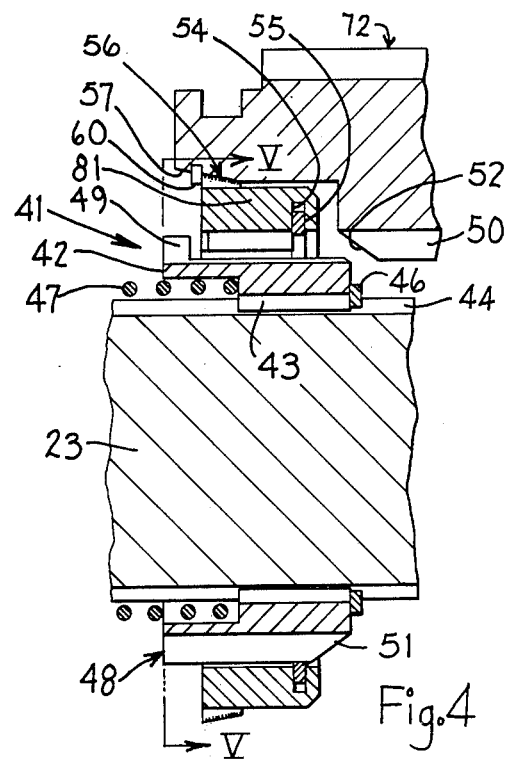
FIG. 4 is an enlarged fragmentary view of the jaw clutch structure utilized in the rightwardmost gear of FIGS. 1 and 2.
Figure 5:
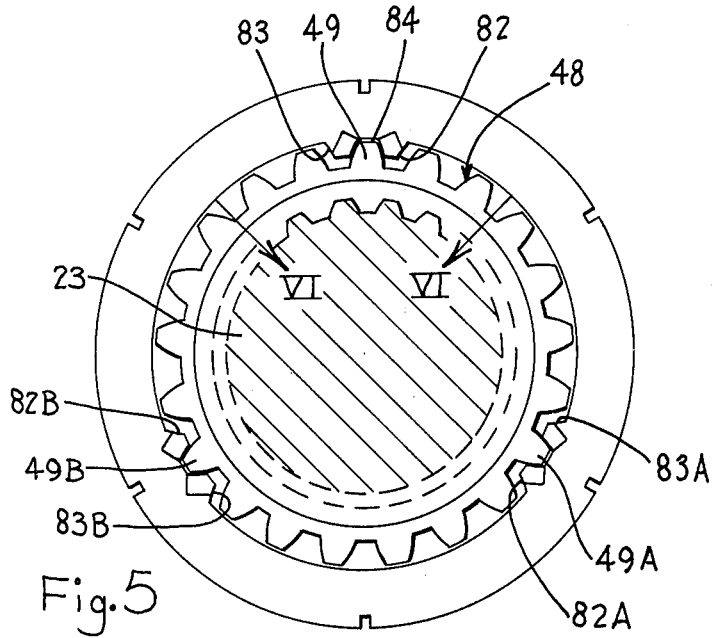
FIG. 5 is a sectional view taken on the line V—V of FIG. 4.
Figure 6:
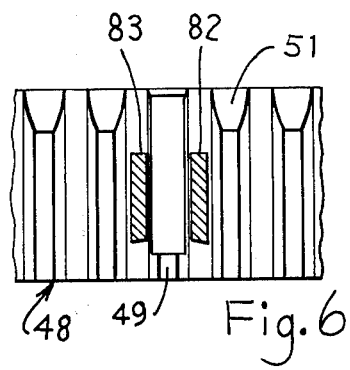
FIG. 6 shows the components of the blocker fragmentarily in unwrapped condition and positioned for unblocking.

On the radially inner side of the ring 81 there is provided an inwardly directed groove 54 which receives an annular resilient ring 55 which is normally of slightly less internal diameter than the external diameter of the teeth 48 so that when the parts are in the assembled condition shown in FIG. 4 said ring 55 is distorted slightly outwardly whereby to exert a light but definite pressure against the external surfaces of said teeth 48. Inasmuch as the ring 55 fits loosely and in only light frictional contact with the walls of the groove 48, this effects a significant resistance to relative axial movement between the blocker ring 81 and the clutch ring 42 but only an insignificant resistance to relative rotative movement therebetween.

A suitable conical surface 56 projects radially outwardly from the blocker ring 81 and is positioned for engagement with a similar conical surface 57 on a radially inner wall of the gear 72. The axial drag above mentioned is sufficient that the rotative driving effect of the surface 57 onto the blocker 41 is much greater than whatever rotative resistance may exist between the blocker 81 and the clutch ring 41. A stop ring 60 limits movement of the blocker 81 away from the conical surface 57 when the clutch ring 41 moves out of engagement (leftwardly in FIG. 4).

The other two partially removed tooth corresponding to the tooth 49 are indicated at 49A and 49B and internally extending teeth on the blocker ring corresponding to the teeth 82 and 83 are indicated at 82A and 83A for cooperation with the partial tooth 49A and at 82B and 83B for cooperation with the partial tooth 49B.

The operation of the blocker 41 is generally similar to that of known blockers. For example, assuming the gear 72 is rotating more rapidly than the clutch member 41, which latter, of course, rotates at the same speed as the main shaft 23, the blocker 81 will normally (ignoring for the moment the effect of the ring 55) tend to rotate with the gear 72, hence lead the clutch component 41 and position the teeth 83, 83A and 83B in a position to interfere with the partial teeth 49, 49A and 49B, respectively, to prevent clutching (rightward) movement of the clutch component 42. However, as the shaft 23 accelerates and a condition of synchronism is approached, the inwardly projecting blocker teeth will become centered with the partial teeth on the periphery of the clutch component 41 and upon reversal of relative speeds the blockers will no longer block and the clutch component 41 will move into clutching condition in the usual manner.

Where the gear 72 is initially running slower than the shaft 23 the operation will be generally silimar to that above described excepting that the blocker 81 will lag behind the clutch component 41 until there occurs a reversal of relative speeds at which blocking will cease and clutching will again be completed in a manner already well known for blocking devices.

Considering now the effect of the blocker rings as above described incorporated into the system of the above-designated application as herein further set forth and described, it will be recognized that when the transmission is brought into a neutral condition and the vehicle stopped from a previous condition wherein the low speed gear 71 was in driving connection, and neutral condition is achieved by neutralizing the gears of the front box, the gear 72 will have been running more slowly than the shaft 23 and hence the blocker in rotating with the clutch component 42 will be running faster than the gear 72 and positioned accordingly. This will remain true with the shaft 23 stationary and hence the only way to move the blocker on the clutch component 42 has in the past been to provide a momentary engagement of the reverse gear 34 in the front box to effect momentary reversal of the shaft 23 and thereby moving of the blocker to its open position for completion of the shift.

However, under the system of the invention, and with the main shaft freed from engagement by all of the gear otherwise connectible thereto, shifting of the gear 72 may be initiated and the slanted ends of one of the teeth 82 or 83, and their counterparts on the remainder of the blocker ring, will engage the corresponding partial teeth 49. The angling faces of the thereby engaged blocker teeth will effect a slight but sufficient rotation of the clutch component 42 and the shaft 23 connected therewith to effect unblocking. It will be noted, however, that the torque created by the relatively shallow angling of the face of the blocker teeth is relatively slight and will be effective only when no other gearing is connected to the shaft 23 so that the inertia of the latter is very low. When other gears are connected to the shaft 23 so that an otherwise conventional shift is taking place, then the angling of the face of the blocker teeth is too shallow to overcome the inertia of such shaft and the blocking proceeds in a normal manner.

Considering now the effect of the compression or drag ring 55, it will be recognized that when there is no appreciable axial pressure rightwardly, as appearing in FIG. 4, on the blocker ring 81, there will be no appreciable friction between the conical surfaces 56 and 57 and hence no tendency for the blocker ring 81 to rotate with the gear 72. However, as the clutch ring 41 commences to move axially, rightwardly in FIG. 4, the axial drag provided by the drag ring 55 urges the blocking ring 81 likewise axially to effect interengagement between the friction surfaces 56 and 57. Since the rotative driving force of the surface 57 onto the blocker ring is greater than the rotative resistance between the blocker ring and the clutch ring 41, the blocking ring 81 commences rotating with the gear 72 and does so prior to contact between the teeth of the blocker 81 and the teeth of the clutch 41. Same then functions thereafter in a normal manner. On disengagement, the stop 60 prevents the blocker 81 from following the clutch ring 41.

Thus, the incorporation of the blocking ring as herein described into the system of the above-identified application brings about the improved operation described in said application as resulting from the use of a blocking ring where heavy components and/or loads are involved but without experiencing the tendency to block improperly as described above. Further, with reference to the blocking ring as such, it will be recognized that the blocking ring herein described requires removal of only a single tooth at the selected tooth removal points around its circumference and in fact does not require the removal even of the entirety of such single tooth. Thus, the resulting clutch system is substantially stronger than those systems where multiple teeth are removed at each such selected circumferential point. Further, the blocking ring itself is of extremely simple construction, yet sturdy and effective for accomplishing the objects of the invention including those specifically set forth above.

While a specific embodiment of the invention has been set forth herein for illustrative purposes, the principles of the invention will be recognized as more broadly applicable and variations will be apparent to those skilled in the art but which variations will be included within the scope of the hereinafter appended claims excepting as said claims expressly require otherwise.

The embodiments of the invention in which an exclusive property or privilege is claimed are defined as follows:

1. In a transmission system including a main shaft and at least one countershaft, multiple pairs of shiftable ratio gears arranged between said main shaft and said countershaft, with jaw clutch devices for connecting at least one of at least some of said pairs of gears to one of said shafts and said jaw clutches including at least one resiliently loaded jaw clutch element being constantly resiliently urged toward engagement position and positively limited in its response to such urging, the improvement comprising:

a blocker ring positioned between said last-named jaw clutch element and the gear with which it is operatively associated and first friction means operative between said blocker ring and said jaw clutch element providing a significant axial drag between said blocker ring and said jaw clutch element without providing appreciable relative rotational drag therebetween and second friction means effective for causing rotation of said blocker ring with said gear upon axial urging of said blocker ring toward said gear in response to initiation of a clutching movement by said jaw clutch element toward said gear;

whereby said blocker ring will normally rotate with said gear upon initiation of a clutching sequence and before axial engagement thereof by the teeth of said jaw clutch element.

2. The device of claim 1 wherein said first friction means includes an internal groove within said blocker ring and a friction ring contained within said groove and bearing against a portion of the teeth of said jaw clutch element.

3. The device of claim 2 wherein said friction ring is a split steel ring of normal diameter slightly less than that of the cylinder defined by the peripheral surfaces of said jaw clutch teeth.

4. The device of claim 1 wherein said first friction means includes an internal groove within said blocker ring and a friction ring contained within said groove and bearing against the peripheral surfaces of the teeth of said jaw clutch element.

5. The device of claim 1 wherein said blocker ring has radially projecting blocker teeth and said last named jaw clutch element has radially projecting teeth arranged for interference with said blocker teeth upon relative axial movement therebetween when said blocker ring is in other than a condition of synchronous rotation with said jaw clutch element and for passage axially therebetween when the rotative speed of said blocker ring crosses that of said jaw clutch element.

6. The device of claim 5 wherein the end faces of said blocker teeth facing said interfering tooth of said jaw clutch element are sloped with respect to a plane normal to the axis of said blocker ring.

7. The device of claim 6 wherein the slope of the faces of said blocker ring teeth is sufficient to effect limited rotation of said jaw clutch element when same is free from engagement with at least substantially all of the ratio gears of said transmission but insufficient to effect such rotation and unblocking during normal operation from one shifted position to another shifted position.

8. In a transmission system including a main shaft and at least one countershaft, multiple pairs of shiftable ratio gears arranged between said main shaft and said countershaft, with jaw clutch devices for connecting at least one of at least some of said pairs of gears to one of said shafts and said jaw clutches including at least one resiliently loaded jaw clutch element being constantly resiliently urged toward engagement position and positively limited in its response to such urging, the improvement comprising:

a blocker ring positioned between said last-named jaw clutch element and the gear with which it is operatively associated, said blocker ring encircling said last-named jaw clutch element for normal rotation therewith and first and second friction means effective for causing rotation of said blocker ring with said gear in response to initiation of a clutching movement by said jaw clutch element relative to said gear, said first friction means effective to apply an axial force for engaging said second friction means without applying a significant rotational drag on said jaw clutch element in response to relative axial movement between said blocker ring and said jaw clutch element;

said blocker ring having radially projecting blocker teeth and said last-named jaw clutch element having radially projecting teeth arranged for interference with said blocker teeth upon relatively axial movement therebetween when said blocker ring is in other than a condition of synchronous rotation with said jaw clutch element and for passage axially therebetween when the rotative speed of said blocker ring crosses that of said jaw clutch element and the end faces of said blocker teeth facing said interfering tooth of said jaw clutch element being sloped with respect to a plane normal to the axis of said blocker ring.

9. The device of claim 8 wherein the slope on the faces of said blocker ring teeth is sufficient to effect limited rotation of said jaw clutch element when same is free from engagement with at least substantially all of the ratio gears of said transmission but insufficient to effect such rotation and unblocking during normal operation from one shifted position to another shifted postion.

10. The apparatus defined in claim 8 wherein the angle of such sloped face is approximately 10°–17° to a plane normal to the axis of said blocker ring.

* * * * *

UNITED STATES PATENT OFFICE
CERTIFICATE OF CORRECTION

Patent No. 3,924,484          Dated December 9, 1975

Inventor(s) Elmer A. Richards

It is certified that error appears in the above-identified patent and that said Letters Patent are hereby corrected as shown below:

Column 2, line 12, "be" should read -- by --.

Figure 7:
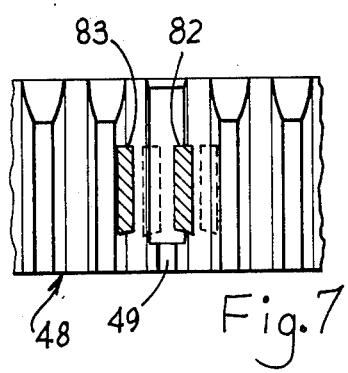
FIG. 7 is a view similar to FIG. 6 showing the parts in synchronous condition permitting shifting.

Column 3, Fig. 7 has been deleted entirely.

Figure 8:
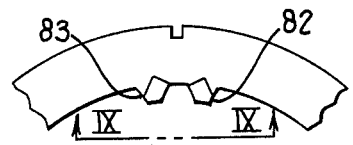
FIG. 8 is a view similar to FIG. 6 showing in solid lines the parts in one blocking condition and in broken lines the parts in the other blocking condition.

Column 3, the first Fig. 8 has been renumber as Fig. 7.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*